United States Patent [19]

Kawano

[11] Patent Number: 5,760,738

[45] Date of Patent: Jun. 2, 1998

[54] GPS OVERLAY SYSTEM FOR A GEOSTATIONARY SATELLITE

[75] Inventor: Shuichi Kawano, Yokohama, Japan

[73] Assignee: Kabushiki Kaisha Toshiba, Kawasaki, Japan

[21] Appl. No.: 722,323

[22] Filed: Sep. 27, 1996

[30] Foreign Application Priority Data

Sep. 29, 1995 [JP] Japan .................. 7-254087

[51] Int. Cl.⁶ .................. G01S 5/02; H04B 7/185
[52] U.S. Cl. .................. 342/357; 342/352; 701/213
[58] Field of Search .................. 342/352, 357; 455/12.1, 13.2; 364/449.7

[56] References Cited

U.S. PATENT DOCUMENTS

| | | | |
|---|---|---|---|
| 4,445,118 | 4/1984 | Taylor et al. | 343/357 |
| 4,918,609 | 4/1990 | Yamawaki . | |
| 5,365,447 | 11/1994 | Dennis . | |
| 5,379,320 | 1/1995 | Fernandes et al. | 375/1 |
| 5,440,491 | 8/1995 | Kawano et al. . | |
| 5,621,646 | 4/1997 | Enge et al. | 364/449 |
| 5,646,630 | 7/1997 | Sheynblat et al. | 342/357 |

FOREIGN PATENT DOCUMENTS

| | | |
|---|---|---|
| 0 488 739 | 6/1992 | European Pat. Off. . |
| 3-270422 | 12/1991 | Japan . |
| 6-222128 | 8/1994 | Japan . |
| 7-209408 | 8/1995 | Japan . |

OTHER PUBLICATIONS

Patent Abstracts of Japan, vol. 95, No. 008, JP-A-07 209408, Aug. 11, 1995.
Patent Abstracts of Japan, vol. 94, No. 012, JP-A-06 342053, Dec. 13, 1994.

Primary Examiner—Thomas H. Tarcza
Assistant Examiner—Dao L. Phan
Attorney, Agent, or Firm—Oblon, Spivak, McClelland, Maier & Neustadt, P.C.

[57] ABSTRACT

Whether or not a pseudo GPS signal is normally received is monitored from the data state in a reception unit. Then, at the stage when the pseudo GPS signal can be normally received, the satellite output timing is substantially synchronized with the ground reference time while the control is carried out so as to advance/delay the timing of outputting a transmission PN code in correspondence to the moving direction of a satellite. Subsequently, a time period ranging from a time point when transmitting the pseudo GPS signal to a time period when receiving the pseudo GPS signal which has been returned via the satellite is observed, while the control is carried out so as to increase/decrease continuously a frequency of the transmission PN code, in such a way that the intermediate time therebetween becomes the reference time. Next, the frequency of the transmission carrier is controlled in correspondence to the control of increasing/decreasing the frequency of the transmission PN code, while the epoch pull out and the reception interruption are monitored, so as to maintain the relationship in which the frequency of the received carrier is 1,540 times as high as that of the received reception PN code frequency. By executing the above-mentioned processings, it is possible to cancel the transponder frequency error of the geostationary satellite site as well as the Doppler component added in the uplink.

4 Claims, 2 Drawing Sheets

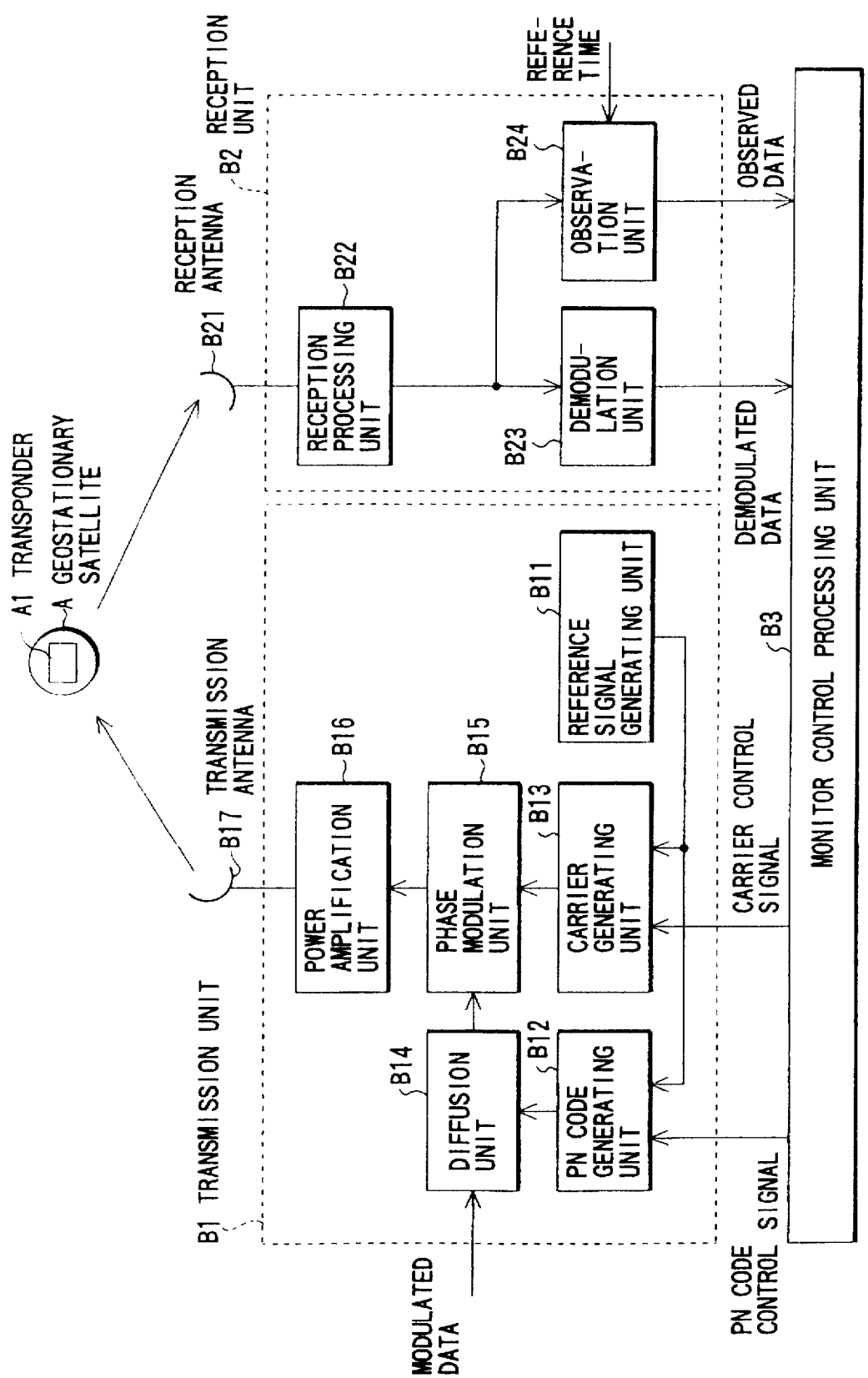
F I G. 1

GPS OVERLAY SYSTEM FOR A GEOSTATIONARY SATELLITE

BACKGROUND OF THE INVENTION

1. Field of the Invention

The present invention relates to a GPS overlay system for a geostationary satellite in which a geostationary satellite is utilized as one of GPS satellites.

2. Description of the Related Art

Currently, a GPS overlay system has been developed in which a pseudo GPS signal is transmitted via a geostationary satellite from a ground station, whereby the geostationary satellite is likened to a GPS satellite so as to be able to be utilized as one of the GPS satellites by a user GPS receiver. However, for the GPS overlay technology for the geostationary satellite, the clear control method has not still been established.

Now, in the GPS satellite, a source of a GPS signal is mounted to the satellite itself, and there is maintained the relationship in which a frequency of a carrier (1575.42 MHz) is just 1,540 times as high as that of a PN code (1.023 MHz). In addition, while the Doppler component which is generated due to the relative velocity developed between the GPS satellite and the user GPS receiver is added to both the PN code frequency and the carrier frequency, the 1,540 times-frequency relationship therebetween is maintained just as it was.

In the recent GPS receiver, in order to improve the accuracy of the observed pseudo distance, the technique is adopted in which by utilizing that frequency relationship, carrier phase data or carrier frequency data is used in the distance calculation. In addition, in the observed position calculation as well, the data relating to the above-mentioned carrier as well as the pseudo distance data are used.

For this reason, the same improvements are required for the pseudo GPS signal transmitted from the geostationary satellite. However, even if the pseudo GPS signal in which the above-mentioned frequency relationship is maintained is transmitted from the ground station, an error occurs in the frequency of the carrier, at a time point when transmitting the pseudo GPS signal from the geostationary satellite, due to the frequency error of a local oscillator in a frequency converter unit of a transponder of the geostationary satellite. As a result, the above-mentioned frequency relationship between the PN code and the carrier is not maintained, and hence there is a possibility that the observation accuracy is reduced and if the worst comes to the worst, the reception can not be carried out.

In addition, the geostationary satellite does not stand still at the fixed position completely, but follows the elliptical orbit so as to come near to or go away from the Earth. As a result, the Doppler component is added to both the PN code frequency and the carrier frequency in the uplink, i.e., until the pseudo GPS signal transmitted from the ground station reaches the geostationary satellite, and hence the pseudo GPS signal is retransmitted with the Doppler component in the uplink contained therein from the geostationary satellite.

On the other hand, the user GPS receiver site handles the geostationary satellite similarly to the GPS satellite. Therefore, while the Doppler component which is added to both the PN code frequency and the carrier frequency in the downlink, i.e., until the pseudo GPS signal transmitted from the geostationary satellite reaches the user GPS receiver is compensated for, the Doppler component in the uplink is not compensated for at all. As a result, when the user GPS receiver has received the pseudo GPS signal from the geostationary satellite, the accuracy of the observed position is reduced due to the Doppler component in the uplink.

SUMMARY OF THE INVENTION

As described above, in the conventional GPS overlay system for the geostationary satellite, there is a possibility that the reduction of the accuracy of the observed position and the state in which the reception can not be carried out may be incurred since the frequency relationship between the PN code and the carrier can not be maintained due to the frequency error in the transponder in the geostationary satellite and also the pseudo GPS signal is retransmitted with the Doppler component in the uplink contained therein.

In view of the foregoing problems associated with the prior art, the present invention was made in order to solve the above-mentioned problems, and hence it is an object of the present invention to provide a GPS overlay system for a geostationary satellite which is capable of cancelling a frequency error in a transponder in the geostationary satellite and also of cancelling the Doppler component added to both the PN code frequency and the carrier frequency in a uplink.

According to the present invention, there is provided a GPS overlay system for a geostationary satellite in which both a PN code and a carrier are generated in a ground station, the PN code is subjected to data modulation using the PN code spectrum diffusion, a pseudo GPS signal is produced by carrier phase modulation using the diffused PN code so as to be transmitted to a geostationary satellite, and the pseudo GPS signal is retransmitted from the geostationary satellite to the ground, thereby utilizing the geostationary satellite as one of GPS satellites, the system including:

pseudo GPS signal receiving means for receiving the pseudo GPS signal from said geostationary satellite (A);

epoch rough synchronization control means (S1, S2, S3) for monitoring the pseudo GPS signal received by said pseudo GPS signal receiving means in order to control the timing of generating the PN code in such a way that when transmitting the pseudo GPS signal, a PN code epoch of the pseudo GPS signal which has been transmitted from the geostationary satellite is substantially synchronized with the ground reference time; and epoch accurate synchronization control means for controlling a frequency of the PN code in such a way that after completion of the rough synchronization by the rough synchronization control means, the intermediate time between the PN code epoch when transmitting the pseudo GPS signal from the ground station to the moving geostationary satellite and the PN code epoch when the ground station receives the pseudo GPS signal from the moving geostationary satellite becomes the ground reference time.

By adopting the above-mentioned structure, it is possible to realize both the time synchronization of the PN code epoch at a transmission output terminal of the geostationary satellite with the ground reference time and the cancelling of the Doppler shift of the uplink PN code (as a result, only the Doppler shift of the downlink PN code due to the movement of the satellite is available to each user GPS receiver).

Further, according to the present invention, in addition to the above-mentioned structure, the system further includes carrier frequency control means for controlling the carrier frequency in such a way that the frequency ratio of the PN code frequency of the monitored pseudo GPS signal to the carrier frequency thereof becomes a constant specified value.

By adopting the above-mentioned structure, it is possible to realize the frequency synchronization of the PN code with the carrier(the frequency error from the transponder station can be deleted since the frequency relationship between the PN code and the carrier is maintained for each user GPS receiver).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

The above and other objects as well as advantages of the present invention will become clear by the following description of the preferred embodiment of the present invention with reference to the accompanying drawings, wherein:

FIG. 1 is a block diagram showing a configuration of an embodiment of a GPS overlay system for a geostationary satellite according to the present invention.

DETAILED DESCRIPTION OF THE PREFERRED EMBODIMENT

Figure 2:
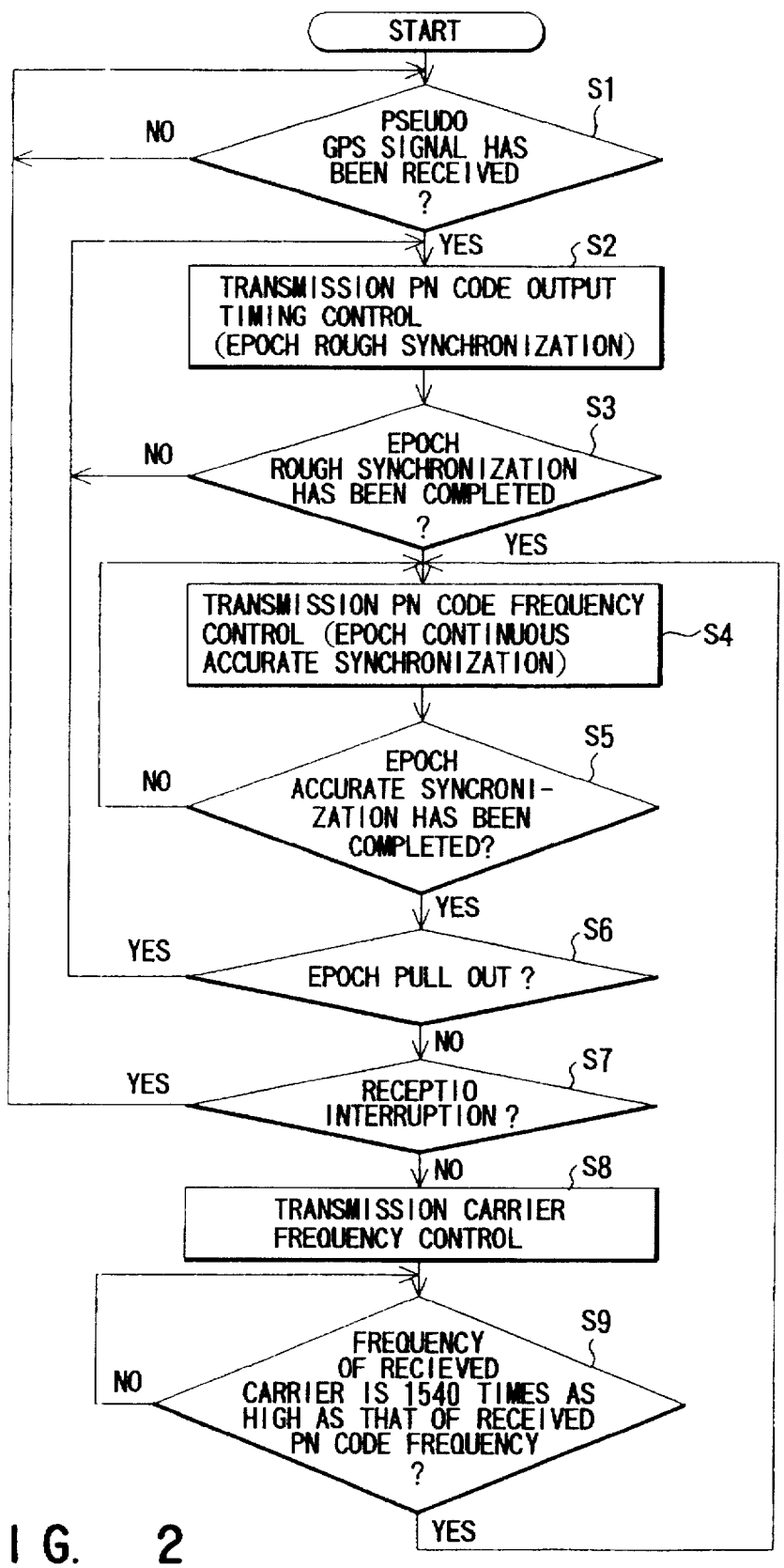
FIG. 2 is a flow chart showing a concrete example of an algorithm of a monitor control processing unit in the embodiment shown in FIG. 1.

The preferred embodiment of the present invention will hereinafter be described in detail with reference to the accompanying drawings.

FIG. 1 shows a hardware structure of a GPS overlay system according to the present invention. In FIG. 1, reference symbol A designates a geostationary satellite and reference symbol B designates a ground station. A transponder A1 which serves, in response to a pseudo GPS signal transmitted from the ground station B, to retransmit the pseudo GPS signal thereto is mounted to the geostationary satellite A.

The ground station B includes a transmission unit B1 for transmitting the pseudo GPS signal to the geostationary satellite A, a reception unit B2 for monitoring the pseudo GPS signal retransmitted from the geostationary satellite A, and a monitor control processing unit B3 for analyzing the monitoring result obtained in the reception unit B2 in order to control the processing of producing the pseudo GPS signal in the transmission unit B1.

The transmission unit B1 includes a reference signal generating unit B11 for generating a frequency signal as the reference, a PN code generating unit B12 for producing a PN code as the main component of the pseudo GPS signal on the basis of an output of the signal generating unit B11, and a carrier generating unit B13 for producing a carrier as the main component of the pseudo GPS signal on the basis of the output of the signal generating unit B11.

The PN code which has been generated in the PN code generating unit B12 is supplied to a diffusion unit B14 which subjects it to the spectrum diffusion with modulated data supplied from the outside (information relating to the reference time, a satellite position and the like). On the other hand, the carrier which has been generated in the carrier generating unit B13 is supplied to a phase modulating unit B15 which subjects it to the phase modulation with the PN code diffused in the diffusion unit B14. The resultant phase modulated signal is then amplified in a power amplification unit B16 so as to be transmitted as the pseudo GPS signal to the geostationary satellite A through a transmission antenna B17.

On the other hand, the reception unit B2 includes a reception antenna B21 for tracking an signal which has been radiated from the direction of the geostationary satellite A, and a reception processing unit B22 for detecting the pseudo GPS signal from the tracking signal. The pseudo GPS signal which has been detected by the reception processing unit B22 is supplied to both a demodulation unit B23 and an observation unit B24.

The demodulation unit B23 extracts the diffused PN code component from the pseudo GPS signal in order to demodulate the modulated data contained in the PN code component thus extracted. In addition, the observation unit B24 observes the shade range and the like of the pseudo GPS signal on the basis of the reference time information supplied from the outside. Both the demodulated data and the observed data are sent to the monitor control processing unit B3.

The monitor control processing unit B3 analyzes the phase shifts of the PN code and the carrier on the basis of the demodulated data and the observed data which have been sent from the reception unit B2, and controls both the PN code generating unit B12 and the carrier generating unit B13 of the transmission unit B1 in such a way that both the PN code and the carrier fulfill the frequency relationship having the above-mentioned ratio.

In the system having the above-mentioned configuration, the description will hereinbelow be given with respect to an algorithm of the monitor control processing unit B3 as the feature of the present invention with reference to FIG. 2.

This algorithm has basically the following three functions and changes the control processings in turn.

(1) Rough synchronization with the reference time inputted from the outside.

The epoch at an output terminal of the satellite is substantially synchronized with the ground reference time.

(2) Accurate synchronization of the epoch with the reference time inputted from the outside.

The epoch at the output terminal of the satellite is accurately synchronized with the ground reference time.

(3) Synchronization of the received PN code with the frequency of the received carrier.

The frequencies of the PN code and the carrier which are received by the ground station are synchronized with each other.

The control processings (1) to (3) will hereinbelow be successively described.

(1) Rough synchronization with the reference time inputted from the outside.

A time period ranging from a time point when transmitting the pseudo GPS signal to a time point when receiving the pseudo signal which has been returned via the satellite is observed, and the output timing of the transmitted PN code is controlled in such a way that the intermediate time between the PN code epoch when transmitting the pseudo GPS signal from the ground station to the moving geostationary satellite and the PN code epoch when the ground station receives the pseudo GPS signal from the moving geostationary satellite becomes the ground reference time, and the epoch (the reference time) at the time point when outputting the pseudo GPS signal by the geostationary satellite A is substantially synchronized with the reference time the data of which is inputted from the outside.

(2) Accurate synchronization of the epoch with the reference time inputted from the outside.

After the rough synchronization has been established with respect to the reference time, the control processing proceeds to the accurate synchronization. But, in this case, the control of the timing of outputting the transmitted PN code is realized by changing the frequency of the PN code.

When the geostationary satellite A is approaching the ground station B at the velocity v, for the transmission timing in the ground station B, it is necessary to delay the transmission timing per unit time. This corresponds to reduction of the frequency of the transmitted PN code, and the reduction amount can be expressed by the following expression.

$$f'\ code = f\ code/(1+v/c)$$

where f' code represents the frequency of the transmitted PN code in the ground station, f code represents the frequency of the PN code, v represents the relative velocity of the geostationary satellite A to the ground station B, and c represents the speed of light.

Since the signal having that f' code is received by the geostationary satellite A approaching the ground station B at the velocity v, the frequency f" code at the reception point of the geostationary satellite A is returned to the original PN code frequency f code as expressed by the following expression.

$$\begin{aligned} f''\ code &= f'\ code \times (1+v/c) \\ &= f\ code \end{aligned}$$

In addition, the Doppler shift occurs since after having been passed through the transponder of the geostationary satellite A, the signal is transmitted to each user including the grounding station B. However, this amount depends on only the Doppler frequency in the transmission due to the movement v of the geostationary satellite A, and therefore that signal is similar to the signal transmitted from the GPS satellite. As a result, the user GPS receiver site can compensate for the Doppler shift.

Incidentally, when the geostationary satellite A is going away from the ground station B, for the transmission timing in the ground station B, it is necessary to advance the transmission timing per unit time. This corresponds to increase of the frequency of the PN code in transmission. Therefore, in this case, this processing can be similarly realized by reversing the polarity in the above-mentioned processing.

In addition, with respect to the control of the frequency of the PN code, for the moving geostationary satellite A, the frequency of the transmission PN code is continuously controlled in such a way that the intermediate time between the PN code epoch in transmission in the ground station B and the PN code epoch in reception in the ground station B becomes the ground reference time. However, the delay in the hardware of the transmission/reception system of the ground station B and the transponder A1 of the geostationary satellite A, ionospheric delay and tropospheric delay in the space, and the like need to be observed by the different method so as to be used in the control calculation.

(3) Synchronization of the received PN code with the frequency of the received carrier.

By executing the above-mentioned processings, the control of the PN code transmission timing and the PN code frequency is established, and hence only the control of the carrier frequency including the transponder frequency conversion error becomes the subject of description.

Since how much error the local oscillator of the transponder mounted to the geostationary satellite A can not be detected, the ground station B controls the frequency of the transmitted carrier in such a way that the Doppler frequency relationship is maintained between the frequencies of the PN code and the carrier which are received by the reception unit B2. In view of the fact that the frequency of the received PN code is subjected to only the Doppler shift in the downlink, that control is carried out with that value as the reference.

That is, in the case where the downlink carrier frequency of the pseudo GPS signal is 1575.42 MHz and the PN code frequency is 1.023 MHz, the control is carried out in such a way that the frequency of the received carrier is 1,540 times as high as that of the received PN code.

The above-mentioned control processing procedure is concretely shown in FIG. 2.

Firstly, whether or not the pseudo GPS signal is normally received is monitored on the basis of the state of the data transmitted from the reception unit B2 (Step S1). As a result of catching and controlling the pseudo GPS signal transmitted from the geostationary satellite A in the reception unit B2, at the stage of being able to normally receive the pseudo GPS signal (YES), the timing of outputting the transmission PN code is advanced or delayed in accordance with the moving direction of the satellite such that the satellite output timing is substantially synchronized with the ground reference time (epoch synchronization)(Steps S2 and S3). By executing the above-mentioned processing, the processing of the rough synchronization of the epoch with the reference time in the above-mentioned item (1) has been completed.

Subsequently, the time period ranging from a time point when transmitting the pseudo GPS signal to a time point when receiving the pseudo GPS signal which has been returned via the satellite is observed while the frequency of the transmission PN code is continuously decreased or increased, such that the intermediate time therebetween becomes the reference time (Steps S4 and S5). By executing the above-mentioned processing, the processing of the accurate synchronization of the epoch with the reference time in the above-mentioned item (2) has been completed.

Next, the frequency of the transmission carrier is controlled in correspondence to the control of increasing/decreasing the frequency of the transmission PN code, while the epoch pull out and the reception interruption are monitored (Steps S6 and S7), so as to maintain the 1,540 times-frequency relationship between the received PN code and the received carrier (Steps S8 and S9). As a result, the processing of synchronizing the frequency of the received PN code with the frequency of the received carrier in the above-mentioned item (3) has been completed.

Incidentally, if the epoch pull out is detected in Step S6 (Y), then the processing is returned to Step S2 and the processing is restarted from the rough synchronization processing. In addition, if the reception interruption is detected in Step S7 (Y), then the processing is returned to Step S1 and the processing is restarted from the processing of tracking/receiving the pseudo GPS signal.

By executing the above-mentioned control processing, it is possible to realize the time synchronization of the PN code epoch at the transmission output terminal of the geostationary satellite A with the ground reference time, the cancelling of the Doppler shift of the uplink PN code (only the Doppler shift of the downlink PN code due to the movement of the satellite is available to each user GPS receiver), and the frequency synchronization of the PN code with the carrier (the frequency error from the satellite transponder can be deleted since the frequency relationship between the PN code and the carrier is maintained for each user GPS receiver).

Incidentally, in the above-mentioned embodiment, both the transmission antenna B17 and the reception antenna B21 may be a same one. In addition, the transmission unit B4 and the reception unit B2 are not necessarily installed in the same station. It is to be understood that the various changes and modifications will occur to those skilled in the art without departing from the scope and true spirit of the invention.

As set forth hereinabove, according to the present invention, it is possible to provide a GPS overlay system for a geostationary satellite which is capable of cancelling the frequency error in the transponder of the geostationary satellite and also of cancelling the Doppler component added to both the PN code frequency and the carrier frequency in the uplink.

What is claimed is:

1. A GPS overlay system for a geostationary satellite in which both a PN code and a carrier are generated in a ground station, the PN code is subjected to data modulation using the PN code spectrum diffusion, a pseudo GPS signal is produced by carrier phase modulation using the diffused PN code so as to be transmitted to a geostationary satellite, and the pseudo GPS signal is retransmitted from said geostationary satellite to the ground, thereby utilizing said geostationary satellite as one of GPS satellites, said system comprising:

pseudo GPS signal receiving means for receiving the pseudo GPS signal from said geostationary satellite;

epoch rough synchronization control means for monitoring the pseudo GPS signal received by said pseudo GPS signal receiving means in order to control the timing of generating the PN code in such a way that when transmitting the pseudo GPS signal, a PN code epoch of the pseudo GPS signal which has been transmitted from said geostationary satellite is substantially synchronized with the ground reference time; and epoch accurate synchronization control means for controlling a frequency of the PN code in such a way that after completion of the rough synchronization by said rough synchronization control means, the intermediate time between the PN code epoch when transmitting the pseudo GPS signal from said ground station to said moving geostationary satellite and the PN code epoch when the ground station receives the pseudo GPS signal from said moving geostationary satellite becomes the ground reference time.

2. A GPS overlay system for a geostationary satellite according to claim 1, further comprising carrier frequency control means for controlling the carrier frequency in such a way that the frequency ratio of the PN code frequency of the pseudo GPS signal received by said pseudo GPS signal receiving means to the carrier frequency thereof becomes a constant specified value.

3. A GPS overlay system for a geostationary satellite according to claim 1, wherein said ground station includes a transmission unit, a reception unit and a monitor control processing unit;

said transmission unit includes a PN code generating unit for generating a PN code, a carrier generating unit for generating a carrier, a diffusion unit for subjecting an output of said PN code generating unit to spectrum diffusion in accordance with input data, a phase modulation unit for subjecting the carrier outputted from said carrier generating unit to phase modulation on the basis of an output of said diffusion unit, a power amplification unit for subjecting an output of said phase modulation unit to power amplification, and a transmission antenna through which an output of said power amplification unit is transmitted as the pseudo GPS signal to said geostationary satellite;

said reception unit includes a reception antenna for tracking therethrough an signal from said geostationary satellite, a reception processing unit for detecting the pseudo GPS signal from an output of said reception antenna, a demodulation unit for extracting the diffused PN code component from the pseudo GPS signal detected by said reception processing unit in order to demodulate the modulated data contained in the PN code component, and an observation unit for observing the characteristics of the pseudo GPS signal on the basis of the reference time information supplied from the outside; and said monitor control processing unit includes an algorithm used to execute said epoch rough synchronization control means and said epoch accurate synchronization control means on the basis of the data obtained in said demodulation unit and said observation unit of said reception unit, said PN code generating unit of said transmission unit being controlled on the basis of PN code generating timing and a controlled value of the PN code transmission frequency which are obtained by the algorithm.

4. A GPS overlay system for a geostationary satellite according to claim 3, wherein said monitor control processing unit further includes an algorithm used to execute said carrier frequency control means for controlling the carrier frequency in such a way that the frequency ratio of the PN code frequency of the monitored pseudo GPS signal to the carrier frequency thereof becomes a constant specified value, said carrier generating unit of said transmission unit being controlled on the basis of a controlled value of the carrier frequency obtained by the algorithm.

* * * * *